US011858103B1

(12) United States Patent
Myers

(10) Patent No.: US 11,858,103 B1
(45) Date of Patent: Jan. 2, 2024

(54) CLAMPING GRIP FOR HYDRAULIC TAMPER

(71) Applicant: Dylan Myers, Okmulgee, OK (US)

(72) Inventor: Dylan Myers, Okmulgee, OK (US)

( * ) Notice: Subject to any disclaimer, the term of this patent is extended or adjusted under 35 U.S.C. 154(b) by 271 days.

(21) Appl. No.: 16/998,232

(22) Filed: Aug. 20, 2020

(51) Int. Cl.
*B25D 17/04* (2006.01)
*B25F 5/02* (2006.01)
*E02D 3/046* (2006.01)

(52) U.S. Cl.
CPC ............ *B25D 17/043* (2013.01); *B25F 5/026* (2013.01); *E02D 3/046* (2013.01)

(58) Field of Classification Search
CPC .............................. B25D 17/043; B25F 5/026
See application file for complete search history.

(56) References Cited

U.S. PATENT DOCUMENTS 4,179,805 A * 12/1979 Yamada .............. B27B 17/0008 30/296.1
4,282,652 A * 8/1981 Ballas, Sr. ........... A01D 34/902 30/276
4,457,472 A * 7/1984 Geberth, Jr. .......... B05B 15/628 239/281
4,752,256 A * 6/1988 Dorion ..................... B63H 5/18 172/14
5,462,127 A 10/1995 Svensson
5,669,101 A * 9/1997 Aiyama ................. A01D 34/90 56/239
6,112,831 A 9/2000 Gustafsson
6,240,644 B1 * 6/2001 Lawrence .............. A01D 34/90 30/296.1
6,616,489 B1 * 9/2003 Dompierre ............. B63H 20/00 440/49
6,701,623 B2 * 3/2004 Sanders ................. A01G 3/062 30/296.1
8,230,551 B2 * 7/2012 Borgerink ............. A47L 9/0027 15/319
8,769,829 B2 * 7/2014 Pelleng ................ A01G 3/0255 30/247
9,777,453 B2 10/2017 Hamilton
9,918,429 B1 * 3/2018 Di Lallo ................ A01B 1/026
9,950,776 B2 * 4/2018 Sacker ................... B63H 23/06
D852,598 S 7/2019 Tang
10,470,635 B2 * 11/2019 Bertrand ............... A47L 9/2857
2007/0067947 A1 * 3/2007 Hittmann ................ B25F 5/026 15/410

(Continued)

OTHER PUBLICATIONS

Greenlee Fairmont H4802 Hydraulic Pole Tamper Compactor 60" with Handle. Product Listing [online]. © 2017-2020 mullet-tindustrialsales.com [retrieved on Mar. 6, 2020]. Retrieved from the Internet: <URL: https://www.mullettindustrialsales.com/product-page/greenlee-fairmont-h4802-hydraulic-pole-tamper-compactor-60-with-handle>.

(Continued)

*Primary Examiner* — Thomas M Wittenschlaeger
*Assistant Examiner* — Katie L Gerth
(74) *Attorney, Agent, or Firm* — CRAMER PATENT & DESIGN, PLLC; Aaron R. Cramer

(57) ABSTRACT

A clamping grip for a hydraulic tamper has an ergonomic handle and a vertical post having an angled base secured to a clamp. At each distal end of the clamp is an aperture. The ergonomic handle is secured to the vertical post via a ball and socket joint which permits the handle to swivel freely about the vertical post.

16 Claims, 5 Drawing Sheets

(56) References Cited

U.S. PATENT DOCUMENTS

| | | | | |
|---|---|---|---|---|
| 2007/0068008 | A1* | 3/2007 | Wu | A01D 34/416 30/298 |
| 2009/0223017 | A1* | 9/2009 | Hittmann | B25F 5/026 15/410 |
| 2010/0059949 | A1* | 3/2010 | Kennard | B25D 17/043 280/47.21 |
| 2012/0234573 | A1* | 9/2012 | Suda | B25F 5/00 173/217 |
| 2012/0312572 | A1 | 12/2012 | Nemetz et al. | |
| 2013/0047802 | A1* | 2/2013 | Vierck | A01D 34/416 16/110.1 |
| 2014/0260839 | A1* | 9/2014 | Hurley | B25F 5/026 81/489 |
| 2016/0136799 | A1* | 5/2016 | Morissette | B25D 17/20 280/47.3 |
| 2018/0085907 | A1* | 3/2018 | Wilson | B62B 5/065 |
| 2018/0111203 | A1* | 4/2018 | Moore | B23B 45/003 |
| 2019/0357436 | A1* | 11/2019 | Hamilton | A01B 1/026 |

OTHER PUBLICATIONS

Stanley TA54103 Hydraulic Tamper with Valve in Handle. Product Listing [online]. © 1996-2020, Amazon.com, Inc. [retrieved on Mar. 6, 2020]. Retrieved from the Internet: <URL: https://www.amazon.com/Stanley-TA54103-Hydraulic-Tamper-Handle/dp/B07N672WWC>.

* cited by examiner

CLAMPING GRIP FOR HYDRAULIC TAMPER

FIELD OF THE INVENTION

The presently disclosed subject matter is directed to a clamping grip for a hydraulic tamper.

BACKGROUND OF THE INVENTION

Tamping in soil or backfill around a newly installed utility pole or even a fence pole has historically been a laborious and back-breaking task. In the past, a laborer or farmer would use a manual tamper—thereby essentially pounding the soil into a settled position. In more recent times the advent of a hydraulic tamper has alleviated some of the labor involved in tamping by permitting a user to mechanically pound the soil into place.

And yet, for all the advantages these devices offer—they can be difficult to hold over a long period of time which in turn becomes needlessly tiring and time consuming. As such a need exists for a means by which an individual may effectively hold a hydraulic tamper in a manner that is ergonomic and cost effective. The clamping grip for a hydraulic tamper fulfills this need.

SUMMARY OF THE INVENTION

The principles of the present invention provide for an auxiliary handle which comprises an upper handle which is equipped with a pair of hand grips to provide for increased comfort and a front clamp which is utilized in combination with a rear clamp to attach the auxiliary handle to a hydraulic tamp. The hydraulic tamp includes a tamping foot, a reciprocating mechanism, a shaft handle, and a plurality of hydraulic connection hoses. The auxiliary handle also comprises a pair of fasteners which have an additional captive fastener which in turn has a plurality of threads and a backing plate. The front clamp and the rear clamp are working in combination with the pair of fasteners and the captive fastener to provide a mechanical connection to the hydraulic tamp that is structurally significant without requiring modification to the hydraulic tamp.

The center portion of the upper handle may terminate in a ball and socket joint that allows for angular displacement of the upper handle along a multi-axis travel path. The angular displacement between an angled section and the shaft abutment may be in the range of 300 degrees to 600 degrees. The angular displacement between the main shaft and the angled section may be in the range of 300 degrees to 600 degrees to ensure that the main shaft is parallel with the shaft abutment and the shaft handle of the hydraulic tamp. The opposite side of the ball and socket joint may include a main shaft. The lower end of the main shaft may terminate in the angled section.

A shaft abutment may be a portion of the angled section that may be placed against the shaft handle of the hydraulic tamp and clamped thereto with the aid of a fastener. The fastener may be selected from the group consisting of a bolt, a screw, or a rivet. The main shaft may be in the range of 8 to 10 inches. The upper handle may be generally "T"-shaped upper handle. The pair of hand grips are ergonomic. The front clamp may be affixed to a bottom portion of the angled section immediately subjacent to the shaft abutment. The front clamp and the rear clamp may be placed along the exterior surface of the shaft handle at one-hundred-eighty-degrees opposite to each other. The fasteners may attach to the shaft handle with the front clamp and the rear clamp to place the upper handle at the upper end of the main shaft at an elevated position allowing for easy handling and use of the hydraulic tamp used in an excavated hole or trench. The fasteners and the captive fastener may be used to tighten the front clamp and the rear clamp together forming a friction fit about the shaft handle.

The front clamp and the rear clamp may be rotated 3600 degree about the shaft handle allowing for positioning both at angular position and height. The auxiliary handle may hold and utilize the hydraulic tamp to reduce contact with the flexible hydraulic connection hoses. The auxiliary handle may be made of material selected from the group of metal, steel, or aluminum. The auxiliary handle may be used in a right or left hand.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
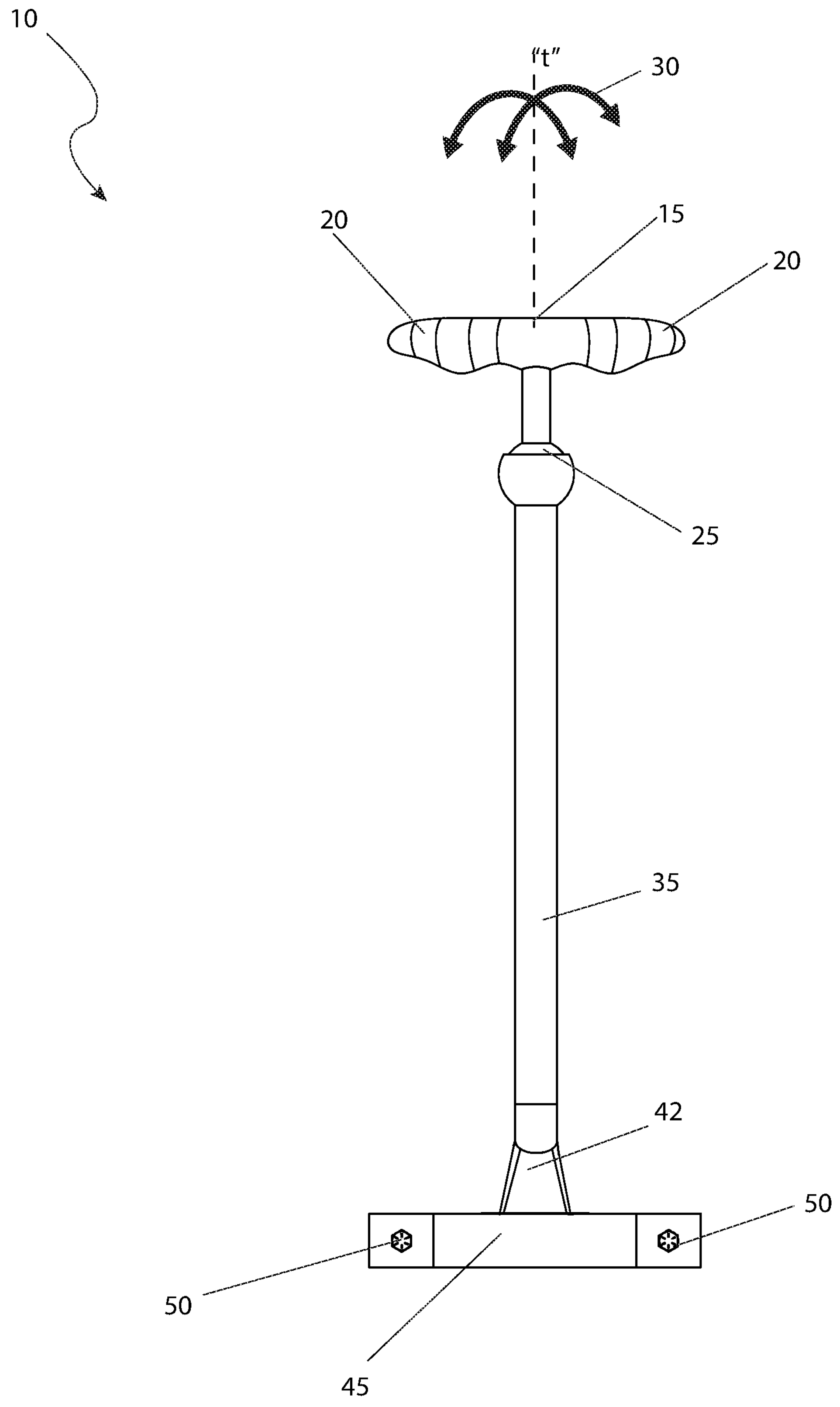
FIG. 1 is a front view of the auxiliary handle, according to the preferred embodiment of the present invention.

10 auxiliary handle
15 upper handle
20 ergonomic hand grip
25 ball and socket joint
30 multi-axis travel path "t"
35 main shaft
40 shaft abutment
42 angled section
45 front clamp
50 fastener
55 angular displacement "a"
55 angular displacement "b"
60 rear clamp
65 captive fastener
70 hydraulic tamp
75 tamping foot
80 reciprocating mechanism
85 shaft handle
90 hydraulic connection hose
95 user
100 earth

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Referring now to FIG. 1, a front view of the auxiliary handle 10, according to the preferred embodiment of the present invention is disclosed. The auxiliary handle 10 (herein also described as the "device") 10, provides an additional means of holding and utilizing a hydraulic tamp 70 to reduce contact with the flexible hydraulic connection hoses 90 by the user. The device 10 includes a generally "T"-shaped upper handle 15 equipped with two (2) ergonomic hand grips 20 to provide for increased user comfort. The center portion of the upper handle 15 terminates in a ball and socket joint 25 that allows for angular displacement of upper handle 15 along a multi-axis travel path "t" 30. The opposite side of the ball and socket joint 25 comprises a main shaft 35 with the approximate dimensions of eight to ten inches (8-10 in.). The lower end of the main shaft 35 terminates in an angled section 42. A shaft abutment 40 is the portion of the angled section 42 that is placed against the shaft handle 85 of the hydraulic tamp 70 and clamped thereto with the aid of a fasteners 50 such as bolts, screws, rivets or the like. The device 10 would be made of metal, such as steel and/or aluminum for strength.

Figure 2:
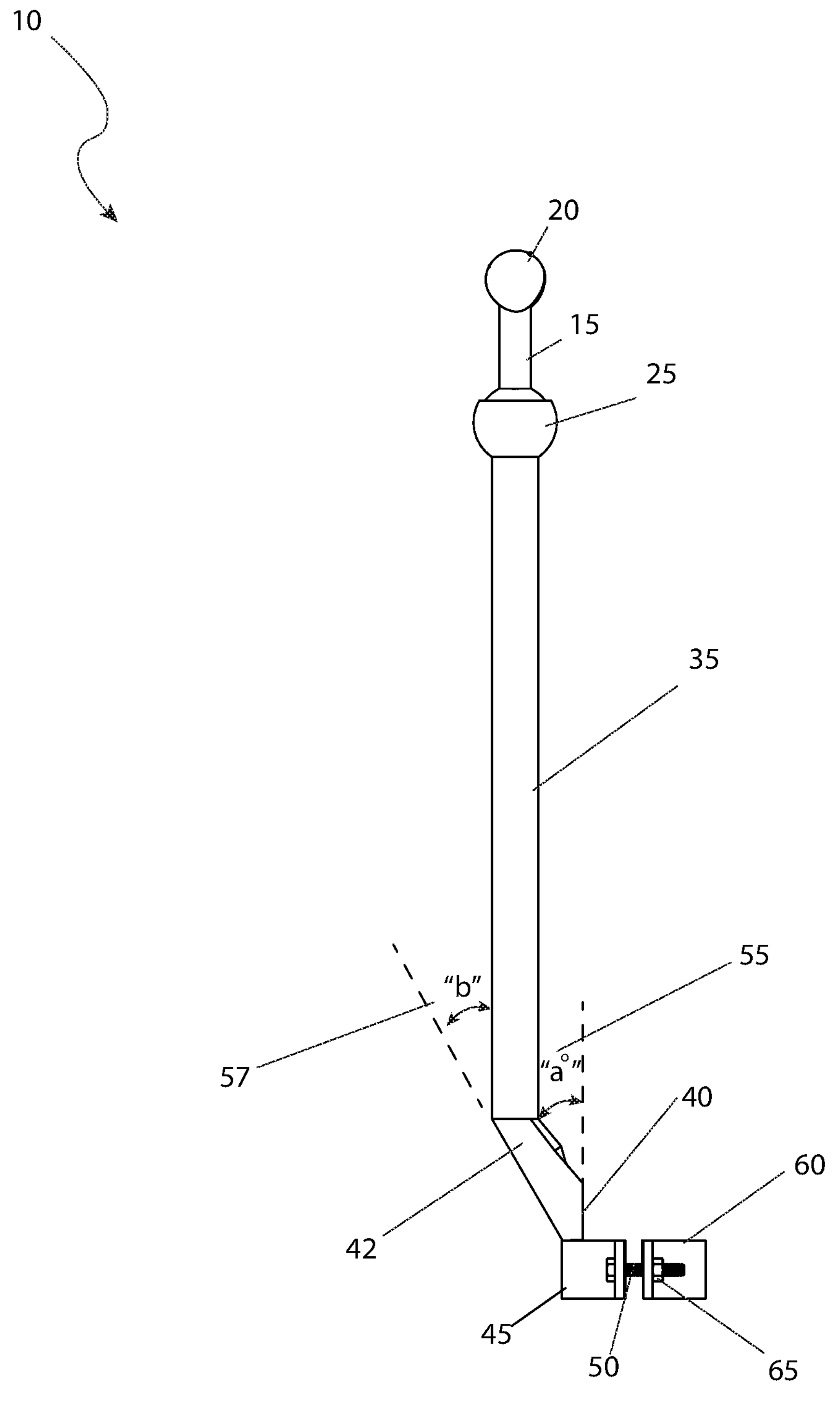
FIG. 2 is a side view of the auxiliary handle, according to the preferred embodiment of the present invention.

Referring next to FIG. 2, a side view of the device 10, according to the preferred embodiment of the present invention is depicted. The side view provides further clarification of the upper handle 15, the ergonomic hand grips 20, the ball and socket joint 25, the main shaft 35 and its angular displacement "b" 57 with relation to the angled section 42, and the angular displacement "a" 55 between the angled section 42 and the shaft abutment 40. The angular displacement "a" 55 between the angled section 42 and the shaft abutment 40 is envisioned to vary between thirty to sixty degrees (30-60°) dependent on user and manufacturing preferences. Similarly, the angular displacement "b" 57 between the main shaft 35 and the angled section 42 is also envisioned to vary between thirty to sixty degrees (30-60°), essentially to be identical to angular displacement "a" 55. This is to ensure that the main shaft 30 is essentially oriented parallel with the shaft abutment 40 and the shaft handle 85 of the hydraulic tamp 70. The exact amount of angular displacement "b" 55 and angular displacement "a" 55 is not intended to be a limiting factor of the present invention.

The front clamp 45 is used in conjunction with a rear clamp 60 to attach the device 10 to the hydraulic tamp 70. Further details on said attachment will be provided herein below. The two (2) fasteners 50 (of which only one (1) is shown due to illustrative limitations) is provided with a captive fastener 65 such as a nut (as shown), threads, backing plate, or the like. Thusly, the front clamp 45 and rear clamp 60, working in conjunction with the fasteners 50 and the captive fastener 65, provide a mechanical connection to the hydraulic tamp 70 that is structurally significant without requiring modification to the hydraulic tamp 70.

Figure 3:
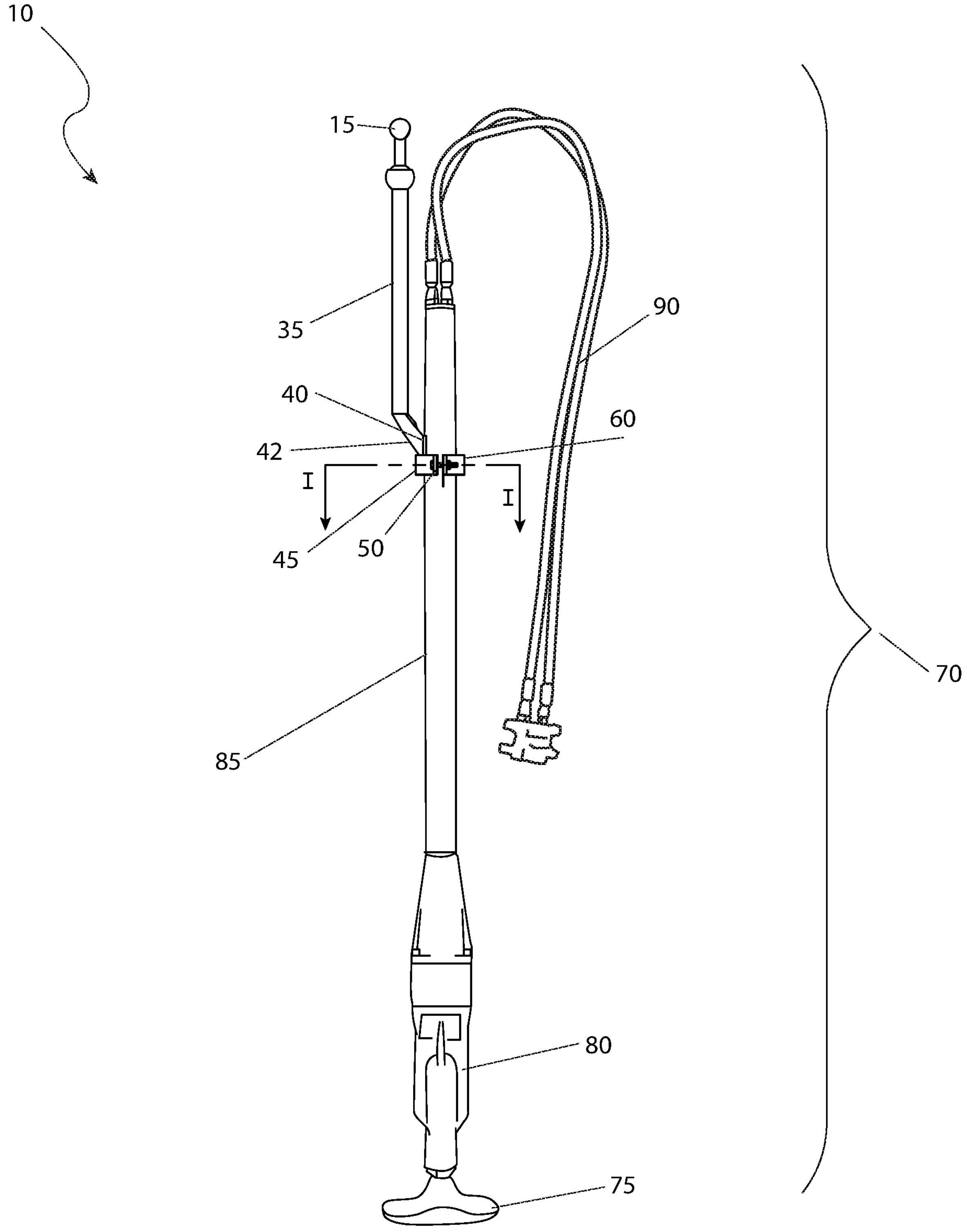
FIG. 3 is a pictorial view of the auxiliary handle shown in an installed state on a hydraulic tamp. according to the preferred embodiment of the present invention.

Referring now to FIG. 3, a pictorial view of the device 10 shown in an installed state on a hydraulic tamp 70. according to the preferred embodiment of the present invention is shown. The hydraulic tamp 70 is of a conventional design including a tamping foot 75, a reciprocating mechanism 80, a shaft handle 85, and hydraulic connection hoses 90. The fasteners 50 attaches to the shaft handle 85 with the aid of the front clamp 45 and the rear clamp 60. This places the upper handle 15 at the upper end of the main shaft 35 at an elevated position allowing for easy handling and use of the hydraulic tamp 70 should it be used in an excavated hole or trench. It also provides for an additional contact point for the hydraulic tamp 70 allowing for increased leverage and ease of handling. It is also viewed as ergonomically friendly in a manner that may help reduce repetitive stress injuries associated with long term usage of a hydraulic tamp 70.

Figure 4:
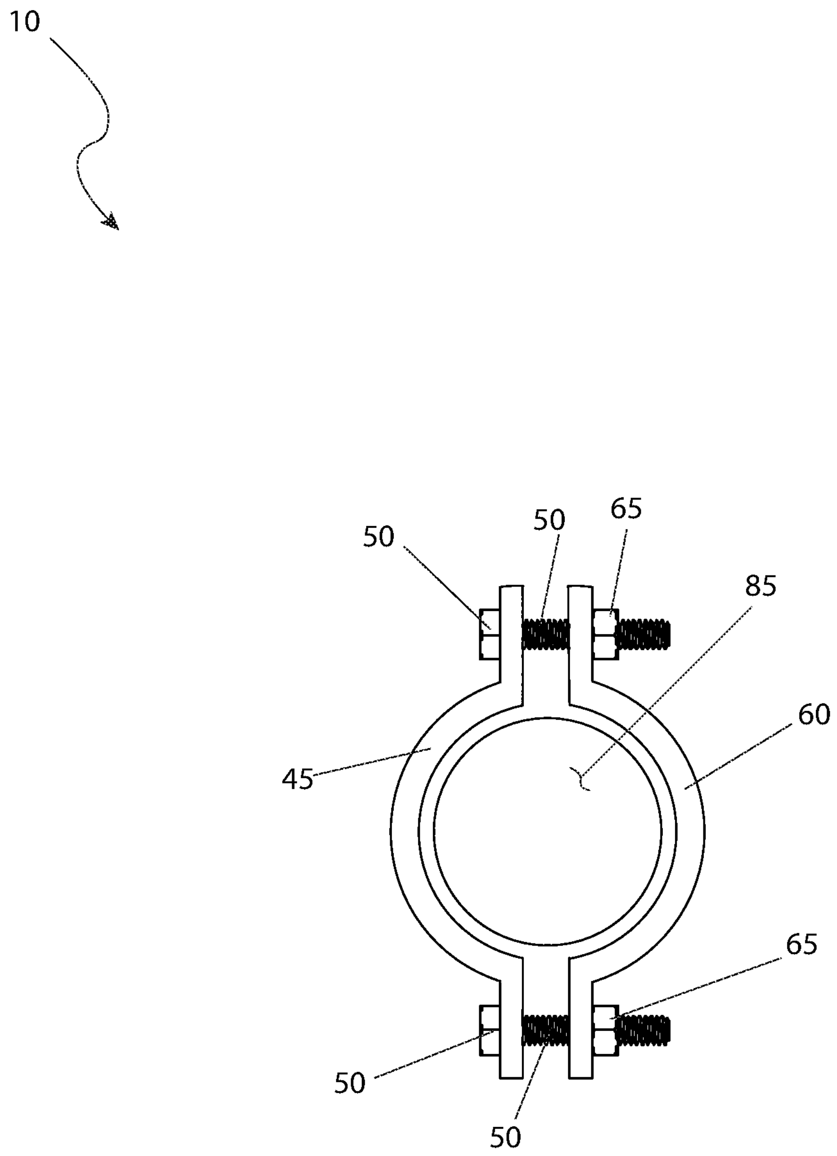
FIG. 4 is a sectional view of the auxiliary handle, as seen along a line I-I, as shown in FIG. 3, according to the preferred embodiment of the present invention; and, FIG. 5 is a pictorial view of the auxiliary handle, shown in a utilized state, according to the preferred embodiment of the present invention.

Referring next to FIG. 4, a sectional view of the device 10, as seen along a line I-I, as shown in FIG. 3, according to the preferred embodiment of the present invention is disclosed. The front clamp 45 is affixed to a bottom portion of the angled section 42, immediately subjacent to the shaft abutment 40. The front clamp 45 and the rear clamp 60 are placed along the exterior surface of the shaft handle 85 at one-hundred-eighty-degrees (180°) opposite to each other. The fasteners 50 and the captive fastener 65 are then used to tighten the front clamp 45 and the rear clamp 60 together forming a friction fit about the shaft handle 85. As aforementioned described, this arrangement does not require any modification to the shaft handle 85 allowing it to be removed at a time in the future without leaving any tell-tale marks behind. Additionally, the arrangement of the front clamp 45 and the rear clamp 60 can be rotated three hundred-sixty degrees (360°) about the shaft handle 85 allowing for positioning both at angular position and height to suit the user's preferences. The shape of the shaft abutment 40 may be planar or curvilinear (i.e., concave with respect to the shaft handle 85). The universal sizing arrangement provided by the front clamp 45 and the rear clamp 60 allow for use on almost all makes and models of hydraulic tamp 70 (as shown in FIG. 3).

Figure 5:
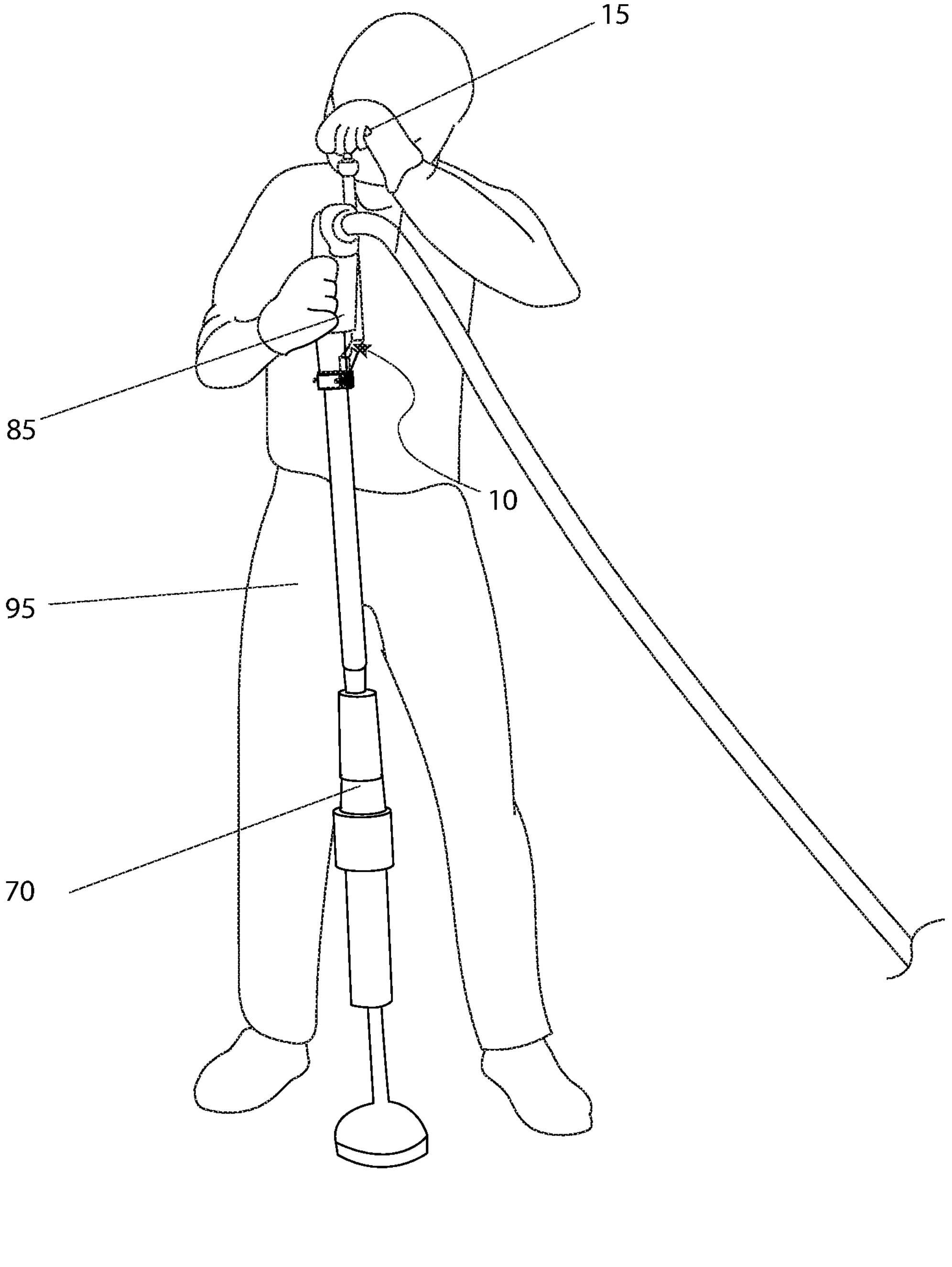

Referring to FIG. 5, a pictorial view of the device 10, shown in a utilized state, according to the preferred embodiment of the present invention is depicted. A user 95 is using the hydraulic tamp 70 equipped with an auxiliary handle for hydraulic tamper 10. This arrangement allows the user 95 to grip the upper portion of the shaft handle 85 in one (1) hand, while the other hand is used to grip the upper handle 15. This arrangement places both hands at or near the same elevation resulting in a more relaxed stance during use versus the conventional stance of one (1) hand in a high position and one hand in a low position, (both on the shaft handle 85). Note that the device 10 can be used in either the right (as shown) or the left hand of the user 95 to suit individual preferences and work conditions.

2. OPERATION OF THE PREFERRED EMBODIMENT

The preferred embodiment of the present invention can be utilized by the common user in a simple and effortless manner with little or no training. It is envisioned that the device 10 would be constructed in general accordance with FIG. 1 through FIG. 5. The user 95 would procure the device 10 from conventional procurement channels such as industrial supply houses, construction equipment suppliers, mechanical supply houses, mail order and internet supply houses and the like.

After procurement and prior to utilization, the device 10 would be prepared in the following manner: the device 10 would be attached to the hydraulic tamp 70 by placing the front clamp 45 and the rear clamp 60 around the shaft handle 85 at the desired location and securing with the fasteners 50 and the captive fastener 65. At this point in time, the device 10 is ready for usage.

During utilization of the device 10, the following procedure would be initiated: the user 95 would hold the hydraulic tamp 70 by both the shaft handle 85 and the upper handle 15 as shown in FIG. 5; it may be held solely by the upper handle 15 as well, especially when the hydraulic tamp 70 is being used at a low elevation in comparison to the user 95 such as in a trench, or at the low point of an excavation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An auxiliary handle, comprising:

an upper handle equipped with a pair of hand grips to provide for increased comfort;

a front clamp utilized in combination with a rear clamp to attach the auxiliary handle to a hydraulic tamp, the hydraulic tamp includes a tamping foot, a reciprocating mechanism, a shaft handle, and a plurality of hydraulic connection hoses; and a pair of fasteners having an additional captive fastener having a plurality of threads and a backing plate;

wherein the front clamp and the rear clamp are working in combination with the pair of fasteners and the captive fastener to provide a mechanical connection to the hydraulic tamp without modification of the hydraulic tamp;

wherein an angular displacement between an angled section and a shaft abutment is in the range of 30° degrees to 60° degrees;

wherein the front clamp is affixed to a bottom portion of the angled section immediately subjacent to the shaft abutment;

wherein an angular displacement between a straight vertical main shaft and the angled section is in the range of 30° degrees to 60° degrees to ensure that the main shaft is parallel with the shaft abutment and the shaft handle of the hydraulic tamp; and wherein the shaft abutment is a portion of the angled section that is placed against the shaft handle of the hydraulic tamp and clamped thereto with the aid of the pair of fasteners.

2. The auxiliary handle, according to claim 1, wherein a center portion of the upper handle terminates in a ball and socket joint that allows for an angular displacement of the upper handle along a multi-axis travel path.

3. The auxiliary handle, according to claim 1, wherein the opposite side of a ball and socket joint includes the main shaft.

4. The auxiliary handle, according to claim 3, wherein a lower end of the main shaft terminates in the angled section.

5. The auxiliary handle, according to claim 1, wherein the fastener is selected from the group consisting of a bolt, a screw, or a rivet.

6. The auxiliary handle, according to claim 1, wherein the main shaft is in the range of 8 to 10 inches.

7. The auxiliary handle, according to claim 1, wherein the upper handle is "T"-shaped.

8. The auxiliary handle, according to claim 1, wherein the pair of hand grips are ergonomic.

9. The auxiliary handle, according to claim 1, wherein the front clamp and the rear clamp are placed along an exterior surface of the shaft handle at one-hundred-eighty-degrees opposite to each other.

10. The auxiliary handle, according to claim 1, wherein the fasteners attach to the shaft handle with the front clamp and the rear clamp to place the upper handle at the upper end of the main shaft at an elevated position allowing for easy handling and use of the hydraulic tamp used in an excavated hole or trench.

11. The auxiliary handle, according to claim 1, wherein the fasteners and the captive fastener are used to tighten the front clamp and the rear clamp together forming a friction fit about the shaft handle.

12. The auxiliary handle, according to claim 1, wherein the front clamp and the rear clamp are rotated 360° degree about the shaft handle allowing for positioning both at angular position and height.

13. The auxiliary handle, according to claim 1, wherein the auxiliary handle holds and utilizes the hydraulic tamp to reduce contact with the flexible hydraulic connection hoses.

14. The auxiliary handle, according to claim 13, wherein the auxiliary handle is made of material selected from the group of metal, steel, or aluminum.

15. The auxiliary handle, according to claim 1, wherein the auxiliary handle is used in a right hand.

16. The auxiliary handle, according to claim 1, wherein the auxiliary handle is used in a left hand.

* * * * *